United States Patent [19]

Tondevold et al.

[11] Patent Number: 5,410,646
[45] Date of Patent: Apr. 25, 1995

[54] SYSTEM AND METHOD FOR CREATING, PROCESSING, AND STORING FORMS ELECTRONICALLY

[75] Inventors: Barrie R. Tondevold, Murray; Keith M. Vreeken, Heber City, both of Utah

[73] Assignee: Park City Group, Inc., Park City, Utah

[21] Appl. No.: 201,478

[22] Filed: Feb. 23, 1994

Related U.S. Application Data

[63] Continuation of Ser. No. 648,838, Jan. 31, 1991, abandoned.

[51] Int. Cl.$^6$ .............................................. G06F 15/62
[52] U.S. Cl. ..................... 395/149; 395/148; 395/200; 345/1; 380/23
[58] Field of Search ............... 395/149, 153, 600, 148, 395/200; 364/401, 406, 241.7, 940.9; 380/23, 25; 345/1

[56] References Cited

U.S. PATENT DOCUMENTS

| | | | |
|---|---|---|---|
| 4,646,250 | 2/1987 | Childress | 364/518 |
| 4,713,753 | 12/1987 | Boebert et al. | 364/200 |
| 5,008,810 | 4/1991 | Kessel et al. | 364/200 |
| 5,032,979 | 7/1991 | Hecht et al. | 364/200 |
| 5,040,132 | 8/1991 | Schuricht et al. | 364/523 |
| 5,091,868 | 2/1992 | Pickens et al. | 395/148 |
| 5,126,728 | 6/1992 | Hall | 340/825.3 |
| 5,182,705 | 1/1993 | Barr et al. | 364/401 |
| 5,187,787 | 2/1993 | Skeen et al. | 395/600 |
| 5,220,604 | 6/1993 | Gasser et al. | 380/23 |
| 5,245,553 | 9/1993 | Tanenbaum | 364/514 |
| 5,251,291 | 10/1993 | Malcolm | 395/146 |
| 5,283,861 | 2/1994 | Dangler et al. | 395/149 |

OTHER PUBLICATIONS

Taylor; *Using Lotus ® Spread Sheet for Desk Mate ®;* 1990; pp. 302, 376-377.

Primary Examiner—Heather R. Herndon
Assistant Examiner—Joseph Feild
Attorney, Agent, or Firm—Fenwick & West

[57] ABSTRACT

An electronic form processing system preferably includes a host computer, a plurality of local computers, form definitions, routing definitions and an organizational hierarchy. Both the host and the local computers further include a central processing unit, a display device, an input device and addressable memory. The processing unit accesses information and instructions from the input device and memory to display forms, complete forms and route the completed forms within the hierarchy of users. With the display and input devices, the user inputs the necessary information to select and complete a form. The system creates a data file and electronically sends the data file to the proper recipients based on the form type and routing definition. The system also tracks the data file to assure that the initiator of the form receives a response.

15 Claims, 7 Drawing Sheets

PURCHASE ORDER

NAME: _____ ID NO.: _____

TITLE: _____

ITEM REQUESTED: _____

COST ESTIMATE: _____

DATE REQUESTED BY: _____

INTENDED USE: _____

LEVEL OF NEED: _____

KNOWN SUPPLIERS

NAME: _____

ADDRESS: _____

CITY: _____ STATE: _____ ZIP CODE: _____

COMMENTS: _____

APPROVAL

DISTRICT MANAGER: _____

AREA MANAGER: _____

FIGURE 3

SYSTEM AND METHOD FOR CREATING, PROCESSING, AND STORING FORMS ELECTRONICALLY

RELATED APPLICATIONS

This is a continuation of application Ser. No. 07/648,838 filed on Jan. 31, 1991, now abandoned.

BACKGROUND OF THE INVENTION

1. Field of the Invention

The present invention relates generally to devices and methods for processing forms and inputting data. In particular, the present invention relates to a system for electronically creating, processing and storing forms and data.

2. Description of Related Art

Printed forms have long been used to simplify the task of gathering information by defining the fields for completion. Printed forms are commonly used in transactions where similar types of information are repeatedly required. For example, most businesses extensively use printed forms such as work orders, purchase orders, employment applications, sales forms, scheduling forms and customer information sheets. However, with the development of computers, printed forms now limit the speed and efficiency of data processing.

One problem associated with printed forms is the conversion of the relevant information on the forms to a format processible by a computer. In many instances, operators must read each printed form and manually input the information contained on that form using keyboards and similar input devices. Inputting such information involves a significant amount of labor and expense, and has forced many to seek cheaper labor sources by shipping original documents outside the United States for processing. The accuracy of the conversion process also presents correction problems that are time consuming as well as logistically troublesome.

Recently, the use of printed forms has increased tremendously which has created problems in producing, storing and processing the printed forms themselves. The cost for producing a form involves the costs for paper, a typesetter and printing. Additionally, the forms must be stored before and after use. In instances where several different forms are used, the task of keeping the forms available requires significant effort and the space for storing the forms is often substantial. It has also become physically difficult to handle the large number of forms as well as being relatively expensive. Forms typically must be transported to several different individuals before use of the form is complete. For example, with a purchase order there may be several intermediate steps where different individuals must approve the purchase by signing the purchase order before an item is actually ordered. Because of the large number of forms typically being sent within a company, the shipping and personnel costs can be large.

Another problem unresolved by the prior art is tracking forms to prevent loss. As noted above, a form typically will be received and sent by several individuals in the chain necessary to process that particular form. At every point where a form is received and forwarded, there is a potential for loss. When printed paper forms are used there is little or no protection against loss of the form in the processing stream.

While there have been attempts in the prior art to eliminate these problems, conventional electronic mail and form processing systems are not entirely successful. Electronic mail systems are limited because they do not provide fixed formats for the data and do not identify types of information or fields that should be input. Typically, electronic mail systems merely provide a free format for sending messages and other data to users of a computer network or system. Similarly, conventional form processing systems have a limited capability for sending and receiving data within a fixed scheme of fields and data types. Form processing systems also do not track the form in the processing stream and do not have the capability to prescribe form routing based on form type.

Therefore, there is a need for an automated system and method for creating and processing forms electronically which completely eliminates the need for paper forms.

SUMMARY OF THE INVENTION

A system and method are disclosed for electronically creating, processing and storing forms and data. The system comprises a computer with a display device, a processing unit, an input device and memory. The memory further comprises form definitions, routing definitions and an organizational hierarchy (sets of rules). The rules specify the fields that must be displayed and completed as well as the routing for each occurrence of the form. The processor uses the form definitions from memory to display a form with blank fields to be completed on the display device. The user controls the input device to enter data to complete the blank fields in the form. After the data required by the form is input, the system automatically forwards the completed occurrence of the form or data file to the appropriate user in the organizational hierarchy according to the routing and form definitions. The system also tracks the transmission of the data file or form to and from positions defined in the organizational hierarchy to prevent data loss. Once the occurrence of the form has been transmitted to the last position in the routing definition a copy of the form is archived by the processing unit.

In the preferred embodiment, the system includes a host computer and a plurality of local computers. The host computer and the local computers include identical form definitions, routing definitions and the organizational hierarchy. Each local computer is coupled to the host computer and all data files must be sent through the host computer. Electronic forms (data files) may be created and transmitted from the host computer or other local computers. The host computer preferably tracks the position of each form, thereby, avoiding the loss of any forms. The host computer also prompts a user if a form requiring a response has not been answered within a predetermined period of time.

The preferred method of the present invention for electronically processing printed forms comprises the steps of: identifying the user and his position; selecting a form definition and a routing definition; inputting the data requested by the form; verifying the accuracy of the data input; electronically transmitting the form to the recipient identified in the routing definition through the host computer; tracking the transmission and receipt of the form; notifying the last recipient if the form does not reach the final destination in the routing definition within a predetermined amount of time.

BRIEF DESCRIPTION OF THE DRAWING

FIG. 3 is a graphic representation of an image of an electronic form on the display device;

DESCRIPTION OF THE PREFERRED EMBODIMENT

The present invention provides a system that eliminates the need for paper forms, except where required by law, by electronically creating and processing forms. The user interacts with the system of the present invention to select and complete an electronic form. Once the form is completed (filled in), the system automatically sends the electronic form to the proper recipient without need for the user to specify a recipient. The system advantageously selects the proper recipient for the completed form based on the form type and the identity of the user. The system also tracks the location of completed forms and notifies the recipient if a reply is overdue.

Figure 1:
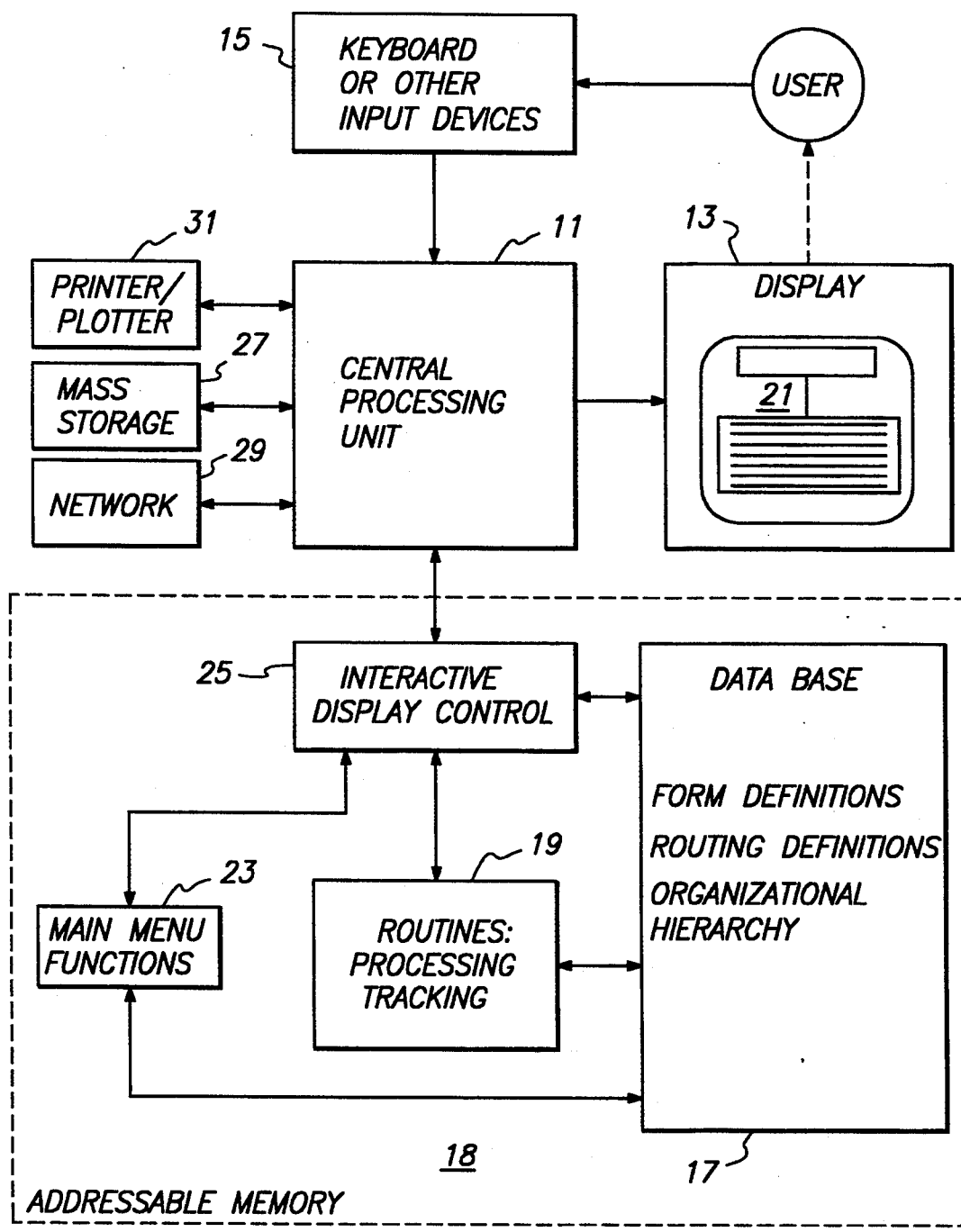
FIG. 1 is a block diagram of a first embodiment for the electronic form processing system of the present invention.

Referring now to FIG. 1, a block diagram of a first embodiment for the system of the present invention is shown. It should be understood that a single computer may be independently operated to perform the electronic form creating and processing functions of the present invention, although a system with a plurality of computers preferred. The computer preferably comprises a central processing unit 11, a display device 13, an input device 15 and an addressable memory 18. The central processing unit 11 is coupled to and controls the display device 13 in response to inputs supplied to the processing unit 11 by user manipulation of the input device 15. The processing unit 11 is also coupled to other sources of information including the addressable memory 18, mass storage 27 and a network 29 in a conventional architecture. A printer 31 is preferably coupled to the processing unit 11 to provide an output for information and a source for hard copies of forms.

The display device 13 and input device 15 are conventional types as known in the art. For example, the display device 13 is a raster-type display used with the processing unit 14 in a conventional manner to produce images of characters generated from codes such as ASCII. The input device 15 is also a conventional type, preferably a keyboard with a "mouse" type controller.

The addressable memory 18 further comprises: a data base 17 of form definitions, routing definitions and an organizational hierarchy; routines 19 for processing and tracking forms; main menu functions 23; and interactive display control 25. The memory 18 is a conventional type and preferably includes Random Access Memory and Read Only Memory. The data base 17 of form definitions and routing definitions are rules used to specify the number of fields, their position, etc. These rules may be used to produce several occurrences or instances of the same form in which the user inputs unique data for each field and may specify particular recipients.

The processing unit 11 accesses information and instructions in memory 18 for processing information in accordance with the operating sequences of the present invention. These operating sequences are directed to the display of forms, the completion of forms and the routing of the completed forms within the hierarchy of users.

The processing unit 11 displays images of blank forms on the display device 13, as illustrated in FIG. 3. The image of a blank form (here, a purchase order) includes a title 60, several fields 64, 68, 72, 76, 80, 84 and 88, and their respective labels 66, 70, 74, 78, 82 and 86. The input device 15 is used to edit the image and complete or fill in the fields 64, 68, 72, 76, 80, 84 and 88. The title 60 identifies the form being edited. The labels 66, 70, 74, 78, 82 and 86 identify the information such as the name, address, item requested, cost, date requested by and supplier that must be provide by the user. Most of the fields 64, 68, 72, 76, 80, 84 and 88 in the form will have a structured format for the data input by the user because it increases the processing capabilities. For fields 64, 68, 72, 76, 80, 84 and 88, the responses and the space provided are subject to predefined limits. However, the form definition also permits free form responses for certain fields. For example, in the form shown in FIG. 3, a field 92 provides an area for the user to input comments. The response for this field 92 provided by the user may be in any format and of any length.

The system uses the data base 17 of form definitions as source for the information and the format for the image displayed. The form definition specifies the form type, the number of fields, the label for each field, the data type for each field, the protection level for each field, and any interdependencies between the fields. Various form definitions with fields and information similar to printed forms such as, but not limited to, work orders, purchase orders, employment applications, sales forms, scheduling forms and new customer information sheets are utilized by the present system. The use of form definitions advantageously permits the creation of additional forms suited to the needs of the users. Each form definition preferably includes a title 60 which allows the user to identify the form being completed.

The form definition also includes a list of linked forms. The linked forms listed in the form definition will be presented to the user by the system when the form definition is used. The system forces the user to consider completing the forms listed because they are forms that must be or should be completed with the form selected. For example, the purchase order of FIG. 3 may have a list of forms such as Schedule A, Schedule B and Schedule C within its form definition. After the user selects and completes the purchase order, the system automatically and unconditionally presents Schedules A, B and C on the display device 13 for completion by the user. Thus, the system can assure that all the information required to process a form is present when the form is created. The linking of forms is particularly advantageous because existing forms may be combined and reused by linking them with new forms.

The processing unit 11 compares the data input to the data type such as numerical, character, calculation or decimal in the form definition for a match before information will be accepted. A field may also specify that the input be within a valid range or from within a data base. The data may also require calculation by reference to an equation or table. The user need not provide a response to all fields, however, those field of significance can be designated as requiring a response. The system also uses protection levels to modify the display depending on the user's identity and the protection level for the field. A particular field and its label may be: 1) hidden, 2) displayed only or 3) displayed and modifiable. For example, fields 84 and 88 which are provided for manager approval on the form shown in FIG. 3 may be hidden from view when the purchase order is created by the initiator. Similarly, field 88 may be designated in the form definition to be hidden from view for the district manager while displayed and modifiable for the area manager. Alternately, fields 84 and 88 may be marked display only to let the initiator know that manager approval is required, but prevent the initiator from completing the approval fields 84, 88.

The present system also verifies the validity of data as it is input based on interdependencies between fields in the form definition. For example, one field may be the arithmetic sum of two other fields. As the data is input, it is compared against the data in other fields for accuracy. The interdependencies require comparison of the data input to data bases or files of valid information. For example, fields 72, 76 and 80 can be defined to be dependent on each other to assure the city and zip code are valid for the state provided. The present invention uses conventional methods for defining these interdependencies such as arithmetic operations, field calculations and look-up tables as known in the art.

Figure 4:
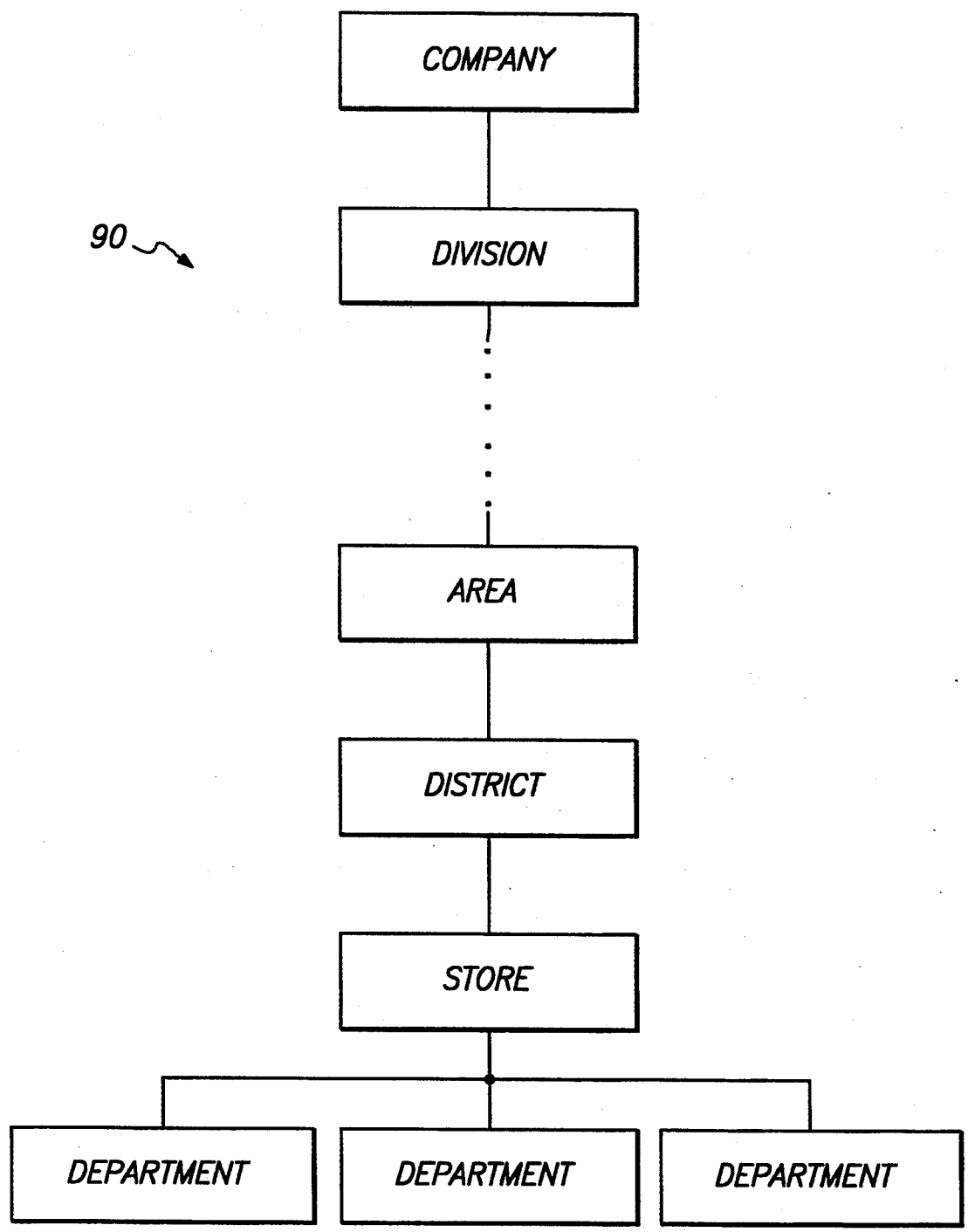
FIG. 4 is a diagram of the organizational hierarchy of the users of the system.

The memory 18 also contains information about an organizational hierarchy 90 and the routing definitions. The system of the present invention preferably includes the organizational hierarchy 90, as shown in FIG. 4. The organizational hierarchy 90 is a definition of user positions within the company and their address for sending forms or data files. The hierarchy 90 may be constructed to match the existing structure of any company, for example, the hierarchy may have 10 levels with several users at each level like the department level shown. It should be noted that FIG. 4 has been simplified for ease of understanding. The organizational hierarchy 90 is used in conjunction with the routing definition to send forms to the proper user based on the form type. Each form includes a routing definition to indicate which users will receive the form. The routing definition preferably identifies the position or address of the recipients of a form by reference to position in the hierarchy 90. For example, the routing definition for sales information from a department includes the area and district managers. Based on the position of the user in the hierarchy, as determined from the user's identification number, and the routing definition, the system automatically (without user identifying the recipients) sends the form to the proper users. Similarly, for the purchase order shown in FIG. 3, the system determines the position of the person completing the purchase order and routes the form to their district manger, then to their area manager, and finally on to the purchasing department at the company level if the purchase was approved.

It should be understood that with the system of the present invention the form definitions, routing definitions and organizational hierarchies may be tailored to fit the specific needs of a company and its organization.

Figure 2:
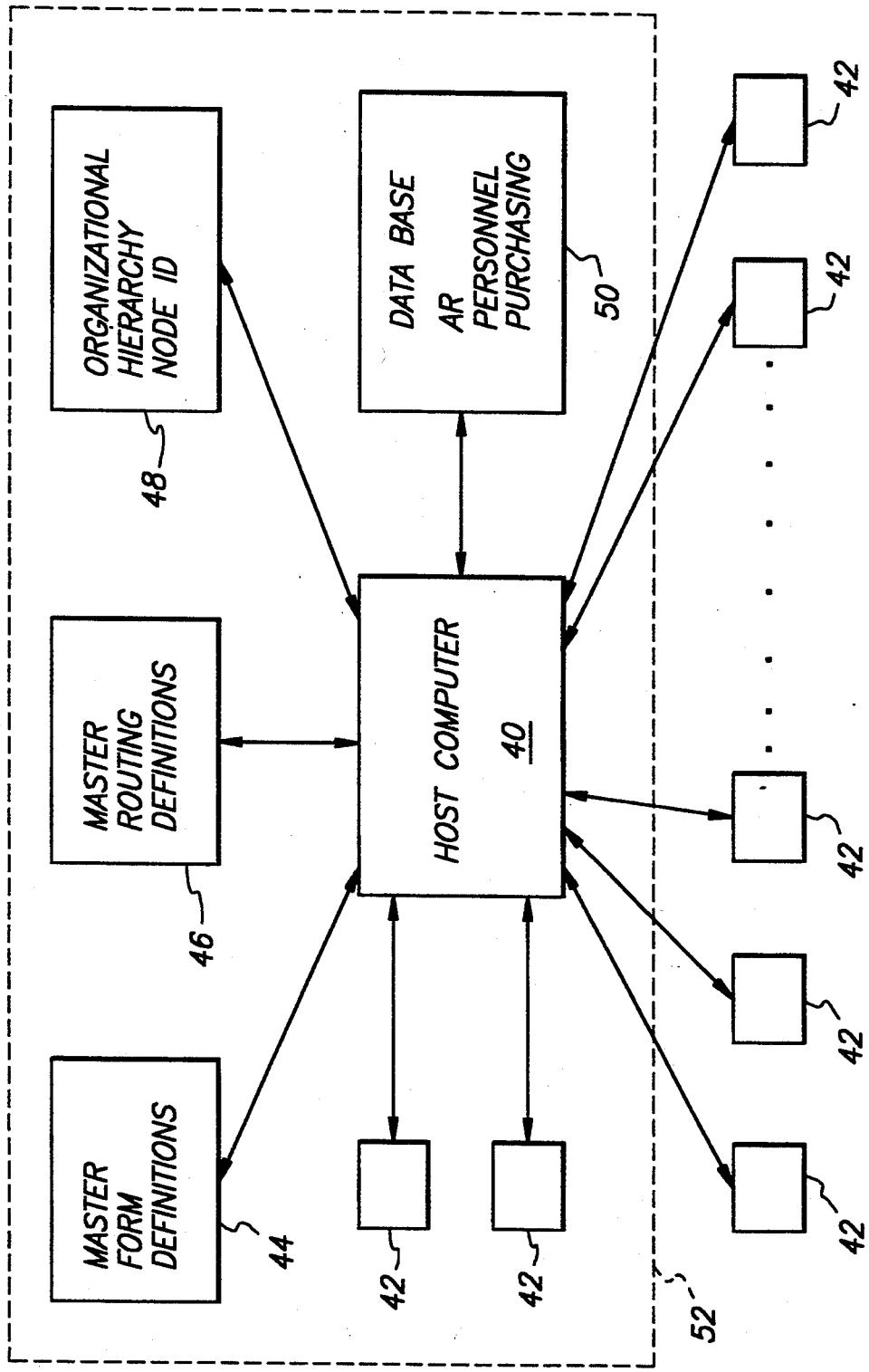
FIG. 2 is a block diagram of a second embodiment of the electronic form processing system of the present invention.

In the second embodiment shown in the block diagram of FIG. 2, the electronic form processing system of the present invention comprises a host computer 40, at least one node or local computer 42, a data base of master form definitions 44, a data base of routing definitions 46, a data base of an organizational hierarchy 48, and a supplemental data base 50 of accounting information. A plurality of local computers 42, as illustrated, is preferred with each node 42 coupled to the host computer 40. Such a configuration allows the transmission of data between any two nodes 42 through the host computer 44. The nodes 42 may be coupled to the host computer 40 in any of a variety of conventional methods. For example, the nodes 42 may be connected to the host 40 with dedicated lines for continuous on-line capabilities. Other nodes 42 may be coupled to the host 40 on an non-continuous basis using telephone lines and modems. In the exemplary configuration of FIG. 2, the host computer 40 is coupled directly to a pair of nodes 42. The host 40 and the two nodes 42 are positioned in a single location 52, such as the company headquarters, indicated by the broken lines. The remaining nodes 42 may be positioned outside the company headquarters 52 anywhere in the world and gain access to the host computer 40 using the telephone lines in a conventional manner. It should be understood that number of nodes 42 at location 52 may be increased or decreased according to the needs of the company using the system, as can the nodes 42 outside the location 52.

In the second embodiment, the host computer 40 has a structure and organization like the computer described above with reference to FIG. 1. The host computer 40 includes a central processing unit, a display device, an input device and an addressable memory. In an exemplary embodiment, the host computer is an IBM AS400 computer. The host computer 40 preferably has an expanded memory which can include the data bases of the master copies of the form definitions 44, routing definitions 46, the organizational hierarchy 48 and the accounting information 50.

Like the host computer 40, the nodes or local computers 42 have a structure and organization similar to the computer of FIG. 1. In an exemplary embodiment, the nodes 42 are personal computers or microcomputers of a conventional type. Each node 42 includes a display device, memory, a processing unit and a keyboard, thereby, allowing forms to be created and sent to and from a number of locations. The similar structure advantageously allows identical copies of the form definitions 44, routing definitions 46 and the organizational scheme 48 to be stored at both the host computer 40 and the nodes 42. This is advantageous because it significantly reduces the amount of data that must be transferred between the host computer 40 and a node 42 to transmit a form. In particular, only the data file of raw data corresponding to the blank fields in a form, a form type and identification of the initiator (the user creating the data file) must be sent between any node 42 and the host computer 40 to pass a form. The labels, data type and dependencies which are typically a large portion of the information does not need to be transmitted between the host 40 and the nodes 42. The data file may also include a header of information detailing the users that have received and transmitted this particular data file.

The method of the present invention uses the systems described above to create, process and store forms electronically. In particular, the preferred method will be described here with reference to a system configured as described and shown in FIG. 2. The method of the present invention comprises the general steps of: displaying a blank form; filling in or completing the form;

sending the form to the recipient, and tracking the location of the form.

Figure 5A:
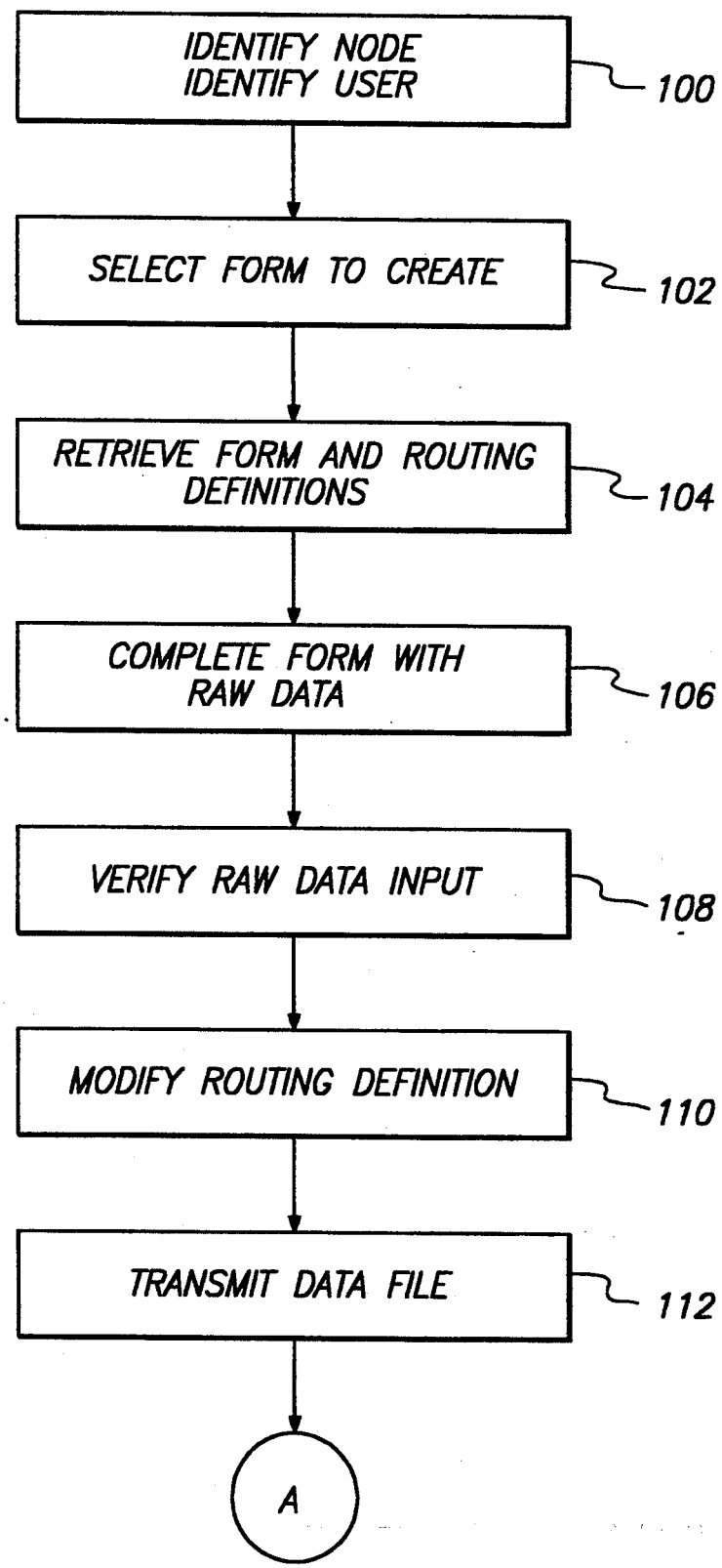
FIGS. 5A, 5B and 5C are a flow chart of the preferred method for creating, processing and tracking the form.

Referring now to the flowchart of FIGS. 5A, 5B and 5C, the method of the present invention will be described in detail. The method begins in step 100 of FIG. 5A by identifying the user and the node 42 used to interface with the system of the present invention. Preferably, identification is automatic since the user typically must provide some type of identification number to gain access to the system. Identification of the user may be done with any of a variety of methods well known in the art. The system identifies the particular node 42 from which the user is working so that forms can be directed the user's current location. In step 102, the user selects a form to complete from a list of defined forms using the input device 15. The present invention advantageously employs pop up menus and user interfaces in a conventional manner to simplify the form selection process. In the next step 104, the processing unit 11 of node 42 being used retrieves from memory 18 the form definition and routing definition corresponding to the form selected in step 102. The processing unit 11 of node 42 displays the labels and fields for the selected form on the display device 13 in accordance with the form definition. The form definition prescribes which fields are displayed and also which fields are protected from modification by the user. Then in step 106, the user manipulates the input device 15 to complete the form by inputting data for the fields of the image shown on the display device 13. In step 108, the processing unit 11 retrieves the interdependencies, data types and range values and verifies the accuracy of the data input by the user. This step verifies the correctness of the data entered by the user by comparing it to a valid range of values for a particular field. The method also compares the data entered to values of other fields where tile value of a particular field may be dependent on the value of those other fields. For example, in processing such forms the values returned for fields that are totals may be compared for accuracy to the values of the fields that make up the totals. If the data input is not within the valid range or correct type, the processing unit 11 requires that valid data be entered for each field. The processing unit 11 of node 42 advantageously stores the data entered in a data file along with a form definition code, the user's identification, and the time and date of creation. Thus, any form created throughout the system will have an original and unique identification number which prevents data loss. While the routing for the form is typically predefined in the routing definition corresponding to the form selected, the user may specify additional recipients by modifying the routing definition in step 110. The system then transmits the data file 112 to the host computer 40 for delivery to the appropriate users.

The system of the present invention may also include a database utility that extracts critical data from all data files transmitted to the host 40 and updates the appropriate portions of the data bases at both the host computer 40 and the node 42. For example, a new employment application may have data such as a new employee's name, address, social security number that must be input into an employee master list stored in memory 18 at the node 42. The database utility advantageously eliminates the need for the host 40 to transmit a form instructing the node 42 to update its memory 18 with the data in the original employment application form sent to the host 42. The database utility automatically extracts the appropriate information based on instructions in the form definition and stores this information in the memory 18 of the node 42 before the data file is transmitted to the host 40. This is particularly advantageous because it eliminates unnecessary transmission of data between the nodes 42 and the host 40.

Figure 5B:
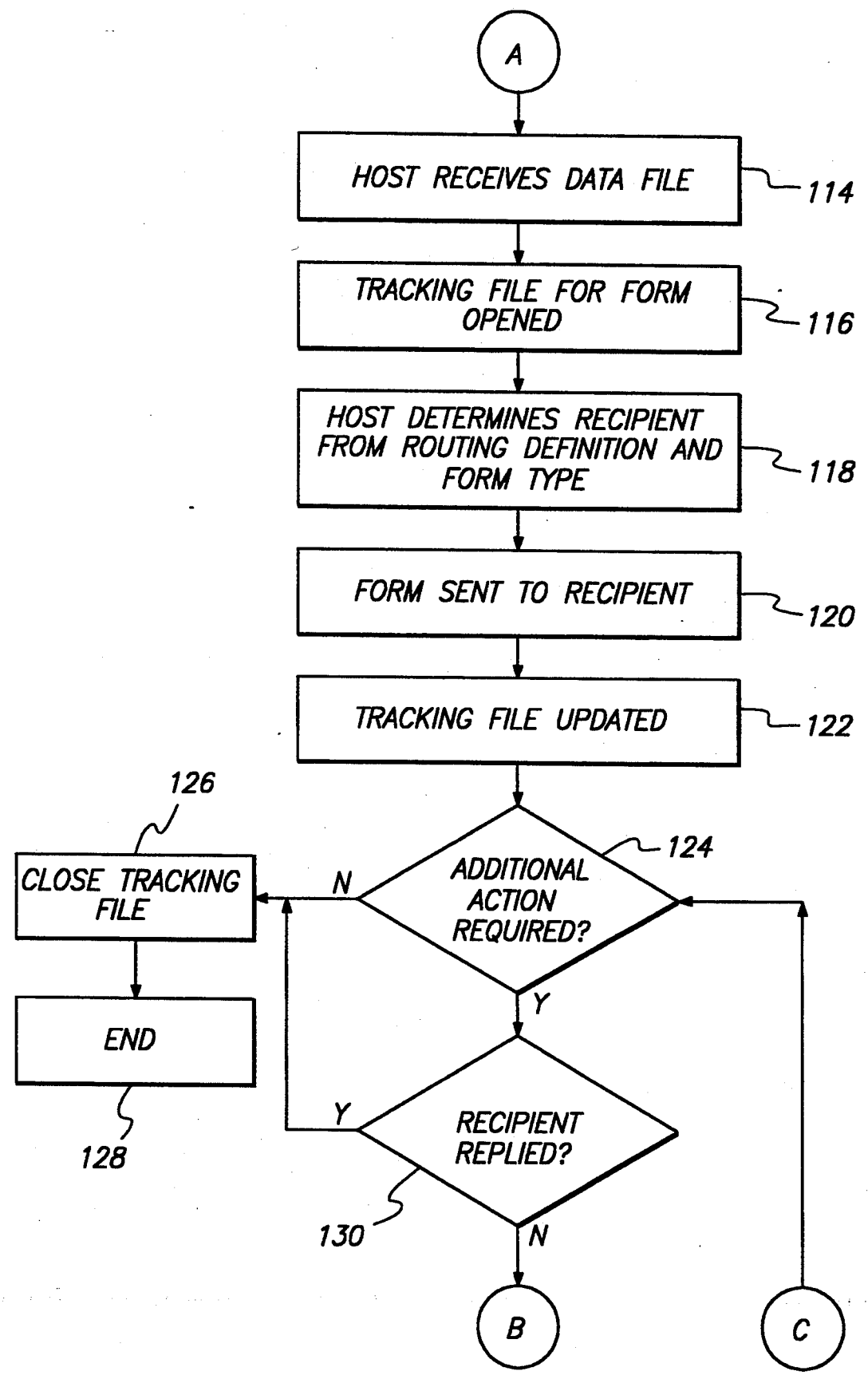
Figure 5C:
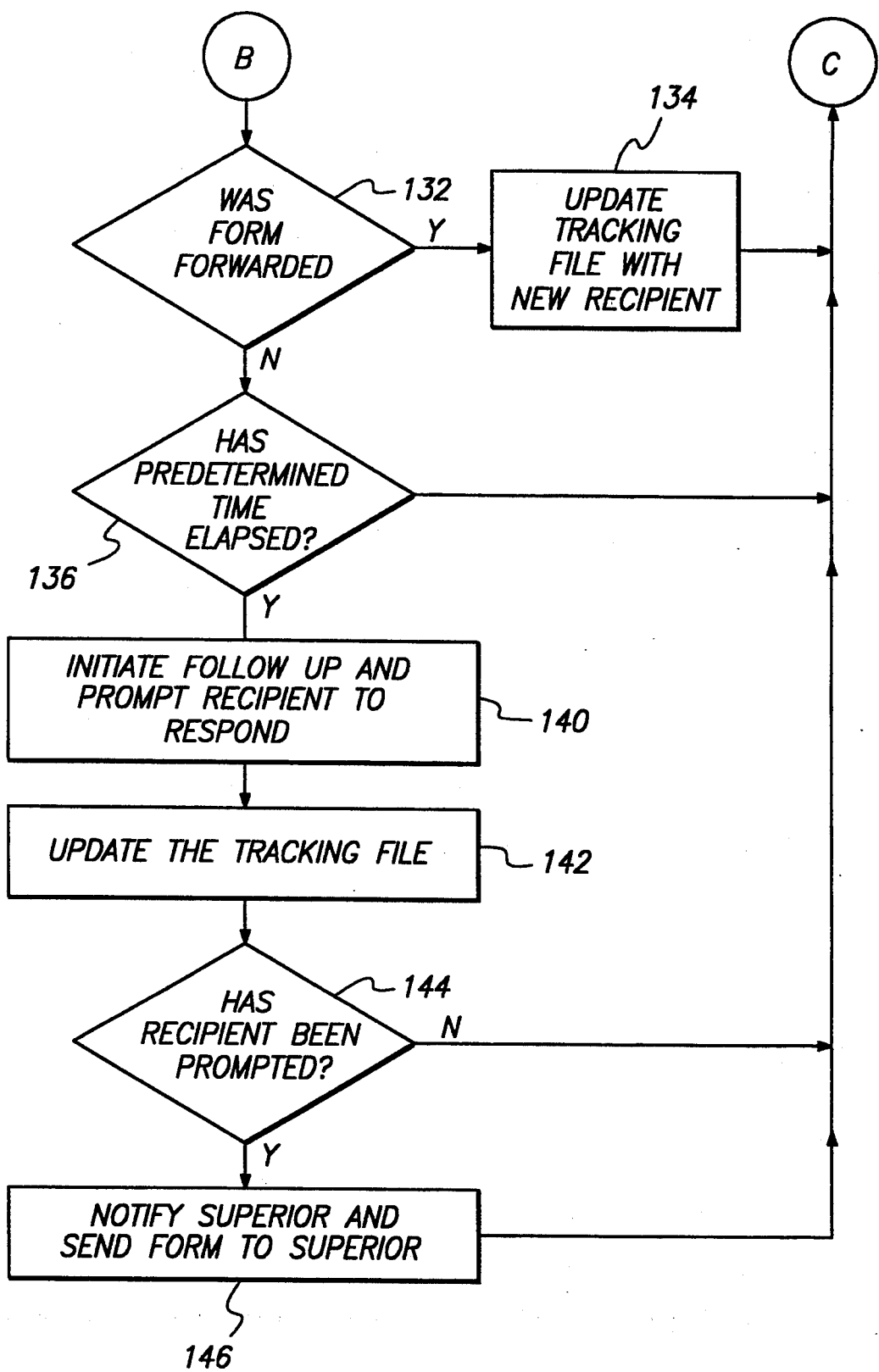

Referring now to FIG. 5B and 5C, the method for delivering and tracking the form is disclosed. In step 114, the data file with the form definition code, the user's identification, and the time and date of creation, and any modifications to the routing definition is received by the host 40. In step 116, the host computer 40 opens a tracking file which will remain open for the "life of the form" (i.e., until the form has reached its destination node 42). The tracking file will be unique for each occurrence of the form created. In the preferred embodiment, the system utilizes rule based expert system techniques conventional in the art to track the form. The form is tracked automatically by the system of the present invention and is invisible the user. However, the user may make inquiries to the host computer 40 to determine the whereabouts of any form that has been sent to the host 40. In step 118, the system extracts the routing information for the data file received in step 114 and determines the recipients for the form. The host 42 determines the recipients from the user's position in the organizational hierarchy, the routing definition, modifications to the routing definition and the form type. Typically, the routing definition specifies the recipients of the data file by identifying particular users in the hierarchy or users with a positional relationship to sender. In step 120, the host 40 completes transmission of the form by sending the data file to the recipients identified in step 118 in proper order. Then the tracking file is updated in step 122 to indicate that the data file has been transferred from the initiator to the first recipient.

The tracking file includes a flag or marker to indicate the class of the form that has been created. In the preferred embodiment, the tracking file may indicate one of three possible classes: information, action or receipt. An information form sent is for the recipient's information only and no further action is necessary. An example of such a form would be a memorandum or message. An action type form indicates that the form requires input from the recipient and further processing either to other users or back to initiator. Examples of an action form are a purchase order or a vacation request where both require the authorization of a superior. The final class of form is a receipt form. With this class of form, the system tracks the form and sends a receipt to the initiator once the recipient receives and reviews the form. In step 124, the system continues to track the form and determine whether additional action is required by reviewing the form's class. If no additional action is required (i.e., the form is for information only), then the tracking file is closed in step 126 and the process is complete in step 128.

On the other hand, if the form requires action, then method of the present invention proceeds to step 130. In step 130, the system tests whether the recipient in the routing definition has responded to the form. If the recipient has responded, the tracking file is closed in step 126 and the process is complete in step 128. If the recipient has not responded then the process continues to step 132 to test whether the form has been forwarded for response. If the form has been forwarded, the present method updates the tracking file by replacing the current recipient with the user to whom the form was forwarded. The method then loops to step 124 and continues to track the position of the form in the hierarchy 90. If the form was not forwarded, the system determines whether a predetermined time has elapsed in step 136. Each form has a predetermined time for response in the form definition. The time for response may be set when the user first completes the form or the user can rely on the default setting which preferably prompts a recipient to respond after 10 days. If the predetermined time has not elapsed the system loops to step 124. However, if the predetermined amount of time has elapsed and the recipient has not responded then the system automatically sends a follow up message to the recipient in step 140. In step 142, the tracking file is then updated to indicate that a follow up message has be sent to the recipient.

Finally, the system tests whether the recipient has previously been prompted by the system to respond to an outstanding form. If this is the first instance that the recipient has been prompted, then the method returns to step 124 and repeats the tests described above. If this is not the first time that the recipient has failed to respond to a form requiring action, then the system advantageously refers to the organizational hierarchy 90, and sends a message to the superior of the recipient to indicate that the recipient is non-responsive. In step 146, the recipient's superior is notified and a copy of the form is forwarded. It should be understood that the method of the present invention may be easily modified to prompt the superior only after the recipient has been prompted a specific number of times. After the superior has been prompted, the method returns to step 124 and continues to track the progress of the form.

What is claimed is:

1. A system for routing a form to selected users in a plurality of users of the system, the system comprising:
   a display device for displaying images of forms, each form having defined characteristics;
   a memory means for storing and retrieving data describing the defined characteristics of the forms, the data further describing an organizational hierarchy having a plurality of positions, a user assigned to each position, and an address for each user, the data further defining a plurality of routing definitions, each routing definition including a sequence of selected positions contained in the organizational hierarchy, each form having at least one routing definition;
   an input device for selecting a form and entering data into a displayed image of the form in response to manipulation of the input device; and
   a processing unit coupled to the display device, the memory means and the input device for processing the data stored in the memory means and the data entered with the input device to provide an image of the selected form on the display device with the entered data, the processing unit creating a data file from the entered data, determining the addresses of selected users to automatically receive the data file according to the sequence of selected positions of the organizational hierarchy included in the routing definition for the selected form, and automatically transmitting the data file to the selected users in the defined sequence.

2. The system of claim 1, wherein:
   each of the forms includes a plurality of fields; and
   the defined characteristics of each form further specify a form type, a number of fields in a form, a label for each field, a data type for each field specifying a type of data may be entered in the field, and a protection level for each field specifying positions in the organizational hierarchy, such that only users assigned to the specified positions may access the field.

3. The system of claim 1, wherein the memory means includes computer-implemented routines for instructing the processing unit for providing an image of the forms on the display device, creating data files from data entered with the input device, determining the addresses of selected users by obtaining the address for each user from the position in the organizational hierarchy included in the routing definition, automatically transmitting the data files to the selected users, and storing information describing the status of the transmitting operation.

4. A system for routing a form to selected users in a plurality of users of the system, the system comprising:
   a host computer comprising:
      a display device for displaying images of forms, each form having defined characteristics;
      a memory means for storing and retrieving data describing the defined characteristics of the forms, the data further describing an organizational hierarchy having a plurality of positions, a user assigned to each position, and an address for each user, the data further defining a plurality of routing definitions, each routing definition including a sequence of selected positions contained in the organizational hierarchy, each form having at least one routing definition;
      an input device for selecting a form and entering data into a displayed image of the form in response to manipulation of the input device; and
      a processing unit coupled to the display device, the memory means and the input device for processing the data stored in the memory means and the data entered with the input device to provide an image of a selected form on the display device; the processing unit creating a data file from the entered data determining the addresses of selected users to automatically receive the data file according to the sequence of selected positions of the organizational hierarchy included in the routing definition for the selected form, and automatically transmitting the data file to the selected users in the defined sequence; and
   a node computer coupled to the host computer by coupling means permitting electronic communication between the host computer and the node computer, the node computer for creating, transmitting and receiving data files, the node computer comprising:
      a second display device for displaying images of forms, each form having defined characteristics;
      a second memory means for storing and retrieving data describing the defined characteristics of the forms, the data further describing the organizational hierarchy having a plurality of positions, a user assigned to each position, and an address for each user, the data further defining a plurality of routing definitions, each routing definition including a sequence of selected positions contained in the organizational hierarchy, each form having at least one routing definition, the organizational hierarchy and the routing definitions in the second memory means identical to the organizational hierarchy and the routing definitions in the memory means of the host computer;

a second input device for selecting a form and entering data into a displayed image of the form in response to manipulation of the input device; and a second processing unit coupled to the second display device, the second memory means and the second input device for processing the data stored in the second memory means and the data entered with the second input device to provide an image of the selected form on the second display device, and the second processing unit creating a data file from data entered with the second input device and transmitting the data file to the host computer, the host computer automatically transmitting the data file to the selected users in the defined sequence.

5. The system of claim 4, wherein: each of the forms includes a plurality of fields; and the defined characteristics of each form further specify a form type, a number of fields in a form, a label for each field, a data type for each field specifying a type of data that may be entered in the field, and a protection level for each field specifying positions in the organizational hierarchy, such that only users assigned to the specified positions may access the field.

6. The system of claim 4, wherein the memory means includes computer-implemented routines for instructing the processing unit for providing an image of the forms on the display device, creating data files from data entered with the input device, determining the addresses of selected users by obtaining the address for each user from the position in the organizational hierarchy included in the routing definition, automatically transmitting the data files to the selected users, and storing information describing the status of the transmitting operation.

7. A method for routing a form to selected users on a system that includes a display device, a processing unit, memory and an input device, the method comprising the steps of:

selecting a form, said form including a plurality of fields, said form having defined characteristics, said defined characteristics including a number representative of the number of fields in the form, wherein said form is selected for entering data into selected fields of the form;

displaying an image of the selected form on the display device;

entering data into the form using the input device;

creating a data file for the selected form containing the entered data;

determining from the defined characteristics of the selected form a routing definition for the form;

determining from the routing definition the addresses of selected users in a predefined organizational hierarchy having a plurality of positions, with a user assigned to each position, each user having an address; and automatically transmitting the data file to the selected users.

8. The method of claim 7, wherein:

the defined characteristics of the selected form further specify a form type, a title, a number of fields in the selected form, a label for each field, a data type for each field specifying a type of data that may be entered in the field, and a protection level for each field specifying positions in the organizational hierarchy, such that only users assigned to a specified position may access the field; and the step of displaying includes applying the defined characteristics of the selected form to display the title, the fields, and the field labels.

9. The method of claim 8, further comprising the step of verifying that the entered data is valid using the defined characteristics of the selected form.

10. The method of claim 9, wherein the step of verifying further comprises the step of, for each field in the selected form, comparing the entered data to a database of valid data.

11. The method of claim 9, wherein:

the defined characteristics of the selected form include field interdependency definitions specifying how the validity of data in a first field depends on data in a second field; and the step of verifying further comprises the step of comparing the data entered for the first field to the data entered for the second field, and applying the field interdependencies definitions to determine the validity of data entered in the first field.

12. The method of claim 7, further comprising the steps of:

accepting user input specifying modifications to the routing definitions; and modifying the routing definitions responsive to the user input.

13. The method of claim 7, further comprising the steps of:

storing in the data file data specifying to which users the data file has been transmitted;

retrieving the data specifying to which users the data file has been transmitted;

determining a last user to which the data file was transmitted; and automatically sending a message to the last user after a predetermined time from when the data file was transmitted to the last user.

14. The method of claim 13, wherein a second user is is assigned in the organizational hierarchy to a position superior to the position assigned to the last user, the method further comprising the step of:

automatically transmitting the data file from the last user to the second user after a predetermined time from when the message was sent to the last user, such that the last user no longer has access to the data file.

15. A method for electronically creating and processing forms on a system that includes a display device, a processing unit, memory and an input device, the method comprising the steps of:

selecting a form, having defined characteristics, to be completed;

displaying an image of the selected form on the display device;

completing the selected form by entering data using the input device;

creating a data file for the selected form and the entered data by completing the selected form;

transmitting the data file to users according to the type of form selected;

storing information describing the status of the transmitting step;

storing in the data file data specifying to which users the data file has been transmitted;

retrieving the data specifying to which users the data file has been transmitted;

sending a message to the last user to which the data file has been transmitted after a predetermined time from the step of transmitting;

after a predetermined time from the step of sending the message, notifying a second user who is designated as a superior of the first user; and sending a copy of the data file to the superior.

* * * * *